US008073962B2

(12) United States Patent
Parkinson et al.

(10) Patent No.: US 8,073,962 B2
(45) Date of Patent: Dec. 6, 2011

(54) QUEUED TRANSACTION PROCESSING

(75) Inventors: Paul Parkinson, Wenonah, NJ (US); Hiromu Kato, Tokyo (JP)

(73) Assignee: Oracle International Corporation, Redwood Shores, CA (US)

( * ) Notice: Subject to any disclaimer, the term of this patent is extended or adjusted under 35 U.S.C. 154(b) by 947 days.

(21) Appl. No.: 12/041,409

(22) Filed: Mar. 3, 2008

(65) Prior Publication Data
US 2009/0222823 A1 Sep. 3, 2009

(51) Int. Cl.
*G06F 15/16* (2006.01)
(52) U.S. Cl. ........ 709/230; 709/203; 709/227; 709/228; 709/229
(58) Field of Classification Search .......... 709/203, 709/230, 227, 228
See application file for complete search history.

(56) References Cited

U.S. PATENT DOCUMENTS

| 6,012,094 | A  | * | 1/2000  | Leymann et al. ............ 709/230 |
| 7,024,692 | B1 | * | 4/2006  | Schanze et al. .................. 726/10 |
| 7,089,584 | B1 |   | 8/2006  | Sharma |
| 2004/0015859 | A1 | * | 1/2004 | Potter et al. .................... 717/120 |
| 2005/0210124 | A1 | * | 9/2005 | Chua .............................. 709/219 |
| 2006/0015852 | A1 |   | 1/2006 | Parkinson et al. |
| 2006/0167981 | A1 | * | 7/2006 | Bansod et al. ................. 709/203 |
| 2006/0168139 | A1 | * | 7/2006 | Messinger et al. ............ 709/219 |
| 2006/0174224 | A1 |   | 8/2006 | Parkinson et al. |
| 2006/0179125 | A1 |   | 8/2006 | Pavlik et al. |
| 2006/0259545 | A1 | * | 11/2006 | Garza et al. .................... 709/203 |
| 2007/0043784 | A1 |   | 2/2007 | Parkinson |
| 2007/0150598 | A1 | * | 6/2007 | Potter et al. .................... 709/226 |
| 2009/0138545 | A1 | * | 5/2009 | Desai et al. .................... 709/203 |
| 2009/0210876 | A1 | * | 8/2009 | Shen et al. ...................... 718/100 |

* cited by examiner

*Primary Examiner* — Djenane Bayard
(74) *Attorney, Agent, or Firm* — Squire, Sanders & Dempsey (US) LLP

(57) ABSTRACT

A method, system, and computer program product for processing a transaction between a client and an application server asynchronously in a distributed transaction processing environment having at least one transaction queue manager. An application request is received from a client to initiate a transaction. The request is placed in a transaction request queue by the transaction queue manager. The request is processed at the application server asynchronously relative to the receipt of the request. A response to the request is determined, and the response is placed in a transaction response queue for retrieval by the client.

32 Claims, 4 Drawing Sheets

QueuedTransactionInitialContextFactory
(filtering, priority, host, queue name)
QueuedTransactionEJBProxyHome qtph = ()
QueuedTransaction EJBProxy qtp = qtph.create();
Result = qtp.myapplication();

QUEUED TRANSACTION PROCESSING

FIELD OF THE INVENTION

Embodiments of the invention relate generally to computer processing, and more particularly, to queued transaction processing.

BACKGROUND INFORMATION

Distributed client/server systems have become a standard architecture for the implementation of databases, web servers, application servers, etc. Accesses that are made to the data stored in such systems are known as transactions. Transactions that modify data stored in server systems present certain challenges in the operations of a distributed server system. Many commercial transaction-processing systems use the two-phase commit protocol, which requires a series of messages to be exchanged between a transaction manager and the resource managers. A transaction can end in two ways: a commit, which is the successful execution of each step in the transaction, or a rollback, which guarantees that none of the steps are executed due to an error in one of those steps.

All transactions share the following properties: atomicity, consistency, isolation, and durability (represented by the acronym "ACID"). Atomicity refers to indivisible operations, i.e., operations which will either complete fully, or not at all. Consistency refers to a transaction transitioning persistent data from one consistent state to another. If a failure occurs during processing, the data must be restored to the state it was in prior to the transaction. Isolation refers to transactions not affecting each other. A transaction in progress must be isolated from other transactions. Although several transactions may run concurrently, it should appear to each transaction that all the other concurrent transactions completed before or after it. All concurrent transactions must effectively end in sequential order. If other transactions were allowed to read data that is uncommitted, those transactions could end up with inconsistent data if the transaction is rolled back, or end up waiting unnecessarily if the transaction commits successfully. Durability refers to the persistence of the transaction. Once a transaction has successfully committed, state changes committed by that transaction must be durable and persistent, despite any failures that occur afterwards.

Regardless of the claimed reliability of a system, failure of the system is always a possibility. For the transaction processing system to function properly in the face of a failure, the transaction manager must log information to a non-volatile store that can be used to recover a transaction processing failure. A recovering transaction is one that is reconstructed as a result of a previous failure in the processing of a transaction.

SUMMARY

In one embodiment, a method is provided for processing a transaction between a client and an application server in a distributed transaction processing environment having at least one transaction queue manager. An application request is received from a client. The request is enqueued in a transaction request queue by the transaction queue manager. The request is processed at the application server asynchronously relative to the receipt of the request. A response to the request is determined, and the response is enqueued in a transaction response queue for retrieval by the client.

DETAILED DESCRIPTION

Figure 1:
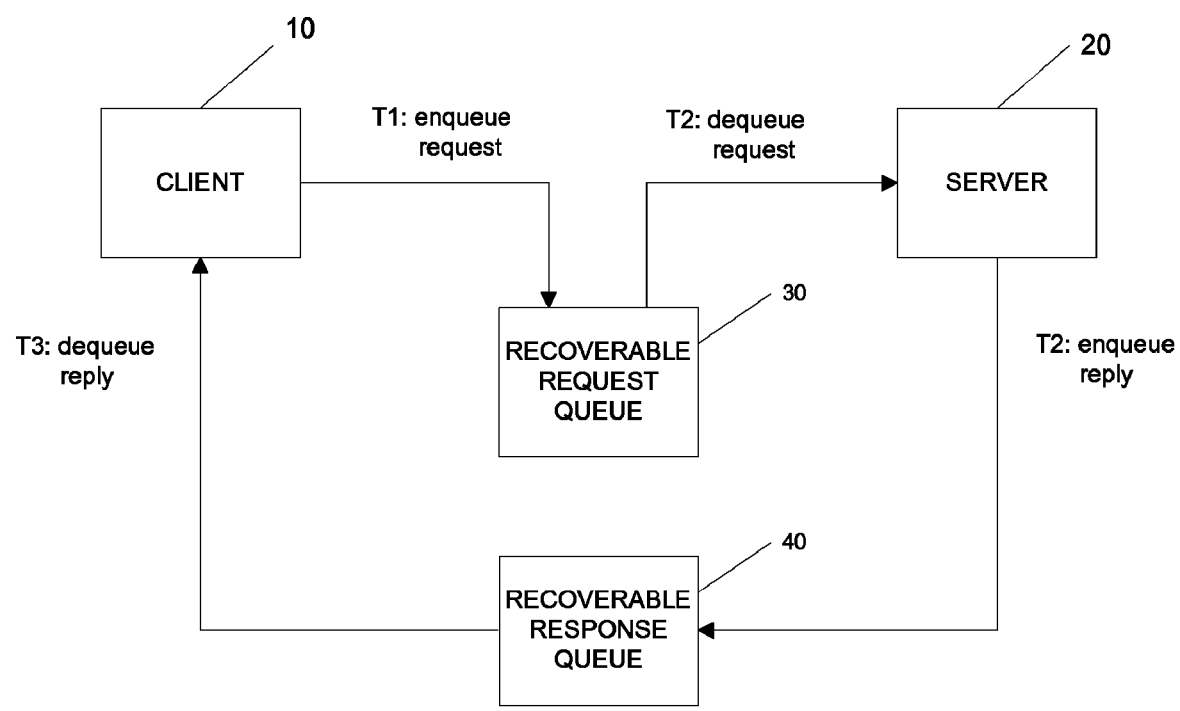
FIG. 1 illustrates a queued transaction processing system that can be adapted for use in exemplary embodiments of the invention.

Embodiments will be described in the context of the Java 2 Platform, Enterprise Edition ("J2EE") platform from Sun Microsystems. J2EE is a widely deployed platform for developing portable, robust, scalable, and secure server-side Java applications.

J2EE provides certain advantages over legacy systems which respect to queued transaction processing mechanisms. J2EE is a multi-tier, client-server architecture and can exploit the ability for modularity in development and maintenance among the presentation, business logic, and data layers. The J2EE architecture can also exploit the ability for scaling and optimal resource allocation. J2EE is standards-based and therefore allows the interoperability of transactional systems, management systems, and other systems. Furthermore, J2EE provides for load-balancing and fault tolerance across multiple server machines. Finally, J2EE is operating system neutral.

J2EE defines a set of services and classes particularly oriented towards transaction-oriented web services. J2EE applications are made up of components. A J2EE component is a self-contained functional software unit that is assembled into a J2EE application with its related classes and files. J2EE components include: (1) application clients that run on the client; (2) Java servlet and JavaServer Pages technology components that run on the server; (3) Enterprise JavaBeans (EJB) business components that run on the server; and (4) web services that run on the server.

Transaction processing in J2EE is considered direct processing. The client waits until a request is serviced. The service is provided as quickly as possible and the result is returned. The client and server are synchronized. In contrast, in queued transaction processing, the request from the client is enqueued. The server dequeues the request for processing and enqueues the result. The client dequeues the result from the server. The client and server processes are performed asynchronously. Queued transaction processing is actually transparent to the client which will behave and respond transparently in its normal Remote Procedure Call ("RPC") manner.

J2EE transactions in existing systems do not take into account the scope of actual application client requests and responses, and instead involve only the unit-of-work conducted upon resource managers, e.g., databases and messaging systems. Therefore, it is possible that a client may issue an application request and not receive the response, or may receive a response that is ambiguous. This issue is exacerbated by the fact that the effects of changes made, or not made, on resource managers in the target/server application transaction are unknown to the client, therefore necessitating additional application logic to determine the outcome which could be infeasible. This is the case although these changes/transactions may have guaranteed ACID properties. Queued transaction processing provides a guaranteed one time delivery of request and response, as well the transactional nature of the unit-of-work conducted by the target/server application.

In addition to the ability to encompass the application request and response state within a transaction, embodiments of the queued transaction processing invention enable priority queuing wherein requests can be ranked by priority with higher priority being given to certain types of requests and target applications. Application requests also can be load balanced dynamically by intelligent workload partitioning and priority queuing thereby enhancing performance. This is particularly noticeable, for example, in the event that a server has crashed or has been taken off-line for maintenance, as requests may be routed to a live server without the need for the client to receive a communication error or implement retry logic. Thus, there is no need to rebuild state when queued transaction processing is used. Queued transaction processing also enables scaling in which target servers are dynamically added to handle more requests without any modification to client code or configuration.

As illustrated in FIG. 1, queued transaction processing involves three transactions T1, T2, and T3 on two recoverable queues 30, 40. In transaction T1, the request from client 10 is enqueued on the recoverable request queue 30. In transaction T2, the server 20 dequeues and services the request from the recoverable request queue 30, and enqueues the response on the recoverable response queue 40. In transaction T3, the client dequeues the reply from the recoverable response queue 40. Using queued transaction processing: (1) the client 10 can enter requests even if the server 20 is unavailable; (2) the server 20 can return results even if the client 10 is unavailable; and (3) the request will ultimately be serviced even if the second transaction aborts.

In conjunction with transaction processing, a transaction manager is middleware to support the global atomicity of distributed transactions. The transaction manager provides services and management functions required to support transaction demarcation, resource management, and synchronization. An application invokes the transaction manager when the transaction is initiated. The transaction manager is informed each time a new resource joins the transaction. The application again invokes the transaction manager when the transaction completes. The transaction manager coordinates the atomic commit protocol participant resources to ensure global atomicity.

In an embodiment of the invention, a transaction mediated into a J2EE environment may comprise any number of state changes and/or data manipulation operations, and may require a J2EE application server to access other external entities (e.g., a database, an enterprise management system, etc.). In compliance with the ACID properties, all changes effected by the transaction can either be committed (i.e., succeed together) or be rolled back (i.e., fail together).

The J2EE Connector Architecture ("JCA") defines a standard architecture for connecting a J2EE platform to an enterprise information system ("EIS") such as a database system, mainframe transaction processing system, legacy application, etc. In particular, JCA enables the development of resource adapters. A resource adapter is a software component that allows J2EE applications to access and interact with the underlying resource manager. A resource adapter is specific to its resource manager that provides access to a set of shared resources. Typically, there is a different resource adapter for each type of database or enterprise information system. A resource adapter provides a specific vendor's implementation of a bridge from J2EE to the EIS, and allows the bridged interaction to leverage system services offered by the application server (e.g., security, transactions). A resource adapter is deployed into, and configured to operate within, a J2EE application server (e.g., as a plug-in or add-on). Illustratively, the server may implement Oracle Containers for Java EE ("OC4J") available from Oracle® Corporation. The resource adapter may be configured to retrieve or receive messages containing transactions or transactional work to be performed by the J2EE container in some other manner (e.g., by querying a queue that stores such messages).

A resource manager is a term used to describe the role of system components that manage the operation of resources, such as a database management system ("DBMS"). A resource is a term used to describe an item that is managed by a resource manager, such as a database managed by a DBMS. The terms "resource manager" and "resource," are used to broaden the description of the system components that are used in the two-phase commit protocol because, when a transaction commits, all of the shared resources it accesses need to get involved in the commitment activity, not just databases. Non-database resources include recoverable scratch pad areas, queues, and other communications systems.

In an exemplary embodiment, the two-phase commit protocol makes several assumptions about each transaction, as described in the following paragraph.

Each transaction accesses resources from time to time. If a transaction experiences a serious error at any time, such as a deadlock or an illegal operation, the transaction issues an abort operation. If the transaction terminates normally without any errors, the transaction issues a commit. In response to the commit, the system runs the two-phase commit protocol.

Each resource manager can commit or abort its part of a transaction, i.e., permanently install or undo transaction operations that involve this resource manager. Therefore, each resource manager typically has a transactional recovery system.

In one embodiment, only one program issues the commit operation on a transaction. That is, one program decides when to start committing the transaction by running the two-phase commit protocol; no other program can start running the protocol on the transaction independently. In some cases, a second attempt to run a two-phase commit while the first attempt is still running will cause the protocol to break, that is, will cause the transaction to commit at one resource manager and abort at another.

A transaction terminates executing at all resource managers before issuing the commit operation. The commit is the point in a transaction when all updates to any resources involved in the transaction are made permanent. In general, this can be hard to arrange. If the transaction does all of its communications using Remote Procedure Calls ("RPC"), then it can ensure the transaction has finished processing at all resource managers by waiting for all of those calls to return, provided that each resource manager finishes all of the work it was asked to do before returning from the call. If the transaction uses other communications paradigms, such as peer-to-peer, then it has to ensure that the transaction terminated by some other means. For example, the well-known LU 6.2 protocol that is part of IBM's System Network Architecture ("SNA"), carefully fits two-phase commit with the transaction termination protocol.

In one embodiment, every system and resource manager fails by stopping. That is, the protocol does not make mistakes when its system or a resource manager malfunctions. It either does exactly what the protocol says it should do, or it stops running. It is possible for a failure to cause the protocol to do something that is inconsistent with the specification, such as sending bogus messages.

Figure 2A:
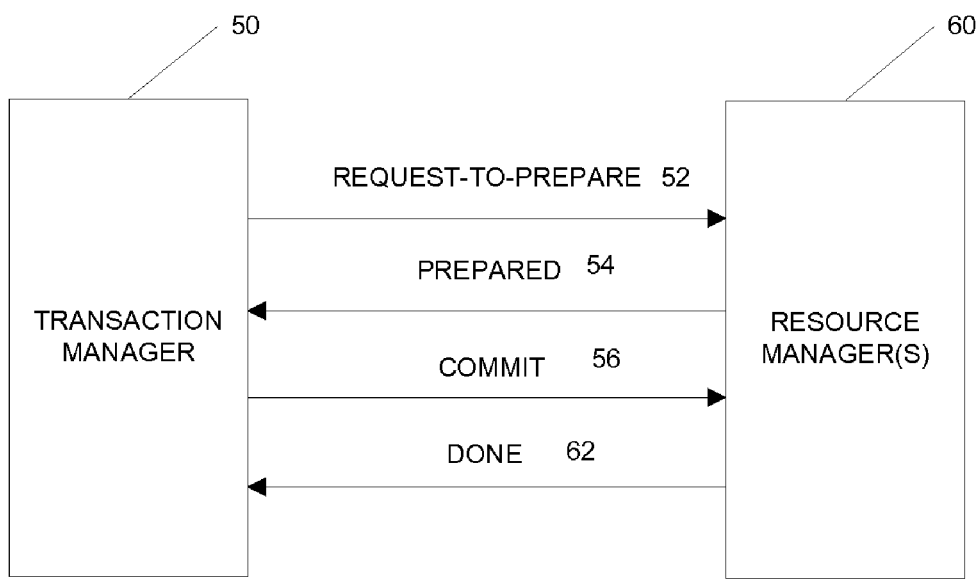
FIGS. 2A-2B illustrate client-server data flow diagrams for the two-phase commit protocol for transaction processing used in embodiments of the invention.
Figure 2B:
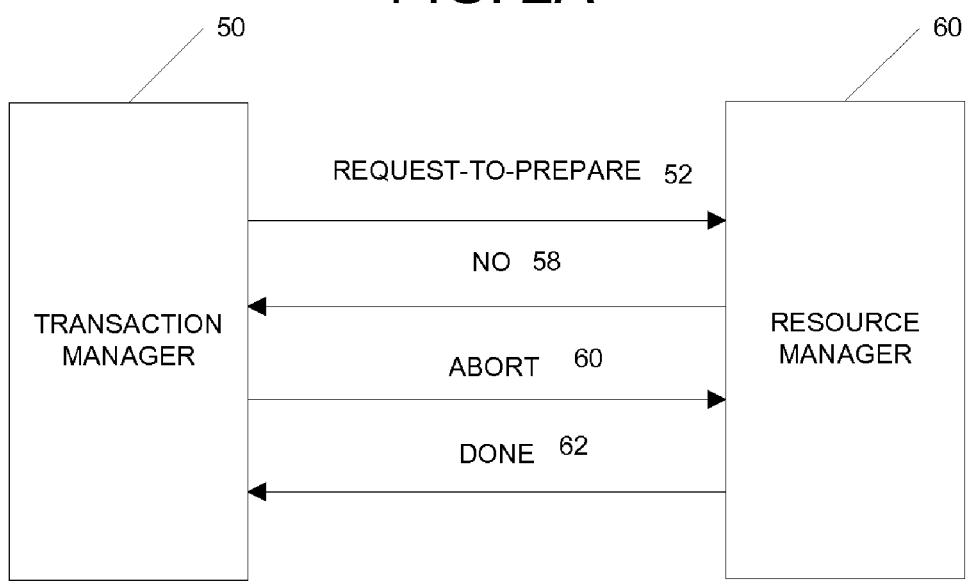

An exemplary data flow diagram of a two-phase commit protocol is shown in FIGS. 2A and 2B. FIG. 2A illustrates operation of the protocol in the situation in which the transaction commits. FIG. 2B illustrates operation of the protocol in the situation in which the transaction aborts. FIGS. 2A and 2B are best viewed in conjunction. In the two-phase commit protocol, messages are communicated between a transaction manager 50 and one or more resource managers 60. Transaction manager 50 is the component that runs the two-phase commit protocol on behalf of one transaction, that is, the transaction manager 50 is the component that receives the commit or abort request and drives the execution of the protocol. Resource managers 60 do work on behalf of the transaction, e.g., by reading and updating resources. The goal is to ensure that the transaction manager and all resource managers commit the transaction, as shown in FIG. 2A, or the transaction manager and all resource managers abort the transaction, as shown in FIG. 2B.

Ensuring that all resource managers are prepared before any of them commits is the essence of two-phase commit. Phase 1 is when all resource managers become prepared. Phase 2 is when they commit. No resource manager enters phase 2 until all resource managers have completed phase 1, that is, until all resource managers are prepared. The protocol proceeds as follows:

Phase 1: To commit the transaction, the transaction manager 50 starts by sending a Request-to-Prepare message 52 to each resource manager 60.

The transaction manager 50 waits for all resource managers 60 to "vote" on the request.

In response to receiving a Request-to-Prepare message 52, each resource manager 60 votes by sending a message back to the coordinator, as follows:

It votes prepared by sending a Prepared message 54 if it is prepared to commit.

It may vote no by sending a No message 58 for any reason, usually because it cannot prepare the transaction due to a local failure.

It may delay voting indefinitely, usually because its system is overburdened with other work.

Phase 2: If the transaction manager 50 receives Prepared messages 54 from all resource managers 60, it decides to commit. The transaction is now officially committed. Otherwise, it either received at least one No message 58 or gave up waiting for some resource manager, so it decides to abort.

The transaction manager 50 sends its decision to all resource managers 60 using Commit messages 56 or Abort messages 60.

Resource managers 60 acknowledge receipt of the Commit messages 56 or Abort messages 60 by replying with Done messages 62.

After receiving Done messages 62 from all resource managers 60, the transaction manager 50 can forget the transaction, meaning that it can deallocate any memory it was using to keep track of information about the transaction.

In embodiments of the invention, queued transaction processing is applied implicitly and transparently as a quality of service feature for J2EE applications. In one exemplary embodiment, the J2EE application server could be the OC4J (Oracle Containers for J2EE) available from Oracle® Corporation. The J2EE facilities provided by OC4J include an Enterprise JavaBeans ("EJB") container, a Java Servlet container, and a JavaServer Pages translator and runtime ("OJSP").

Among other things, the queued transaction processing models provide the following advantages over direct transaction processing models, such as those found in J2EE:

1. The ability to issue work requests against servers that are not currently available. This is not currently possible in J2EE.

2. The ability to allow servers to service work requests based on a characteristic, such as priority, and current workload.

3. The ability for clients to always receive a definitive outcome for a request and never to receive a communication failure or otherwise ambiguous return (i.e., unknown state). Currently, J2EE application clients may receive communication failures during processing which leave the client with an ambiguous application/transaction outcome. Therefore, queued transaction can remedy this failure domain and exactly-once execution guarantees.

4. The ability to provide client recovery in the face of client process crashes. Although it is possible to provide client-side recovery using queued transaction processing, J2EE applications are generally not designed in a way that would allow for this recovery to be exploited. For example, an application would need to start from the execution point where it was before the crash or all operations leading up to the point would need to be idempotent.

Figure 3:
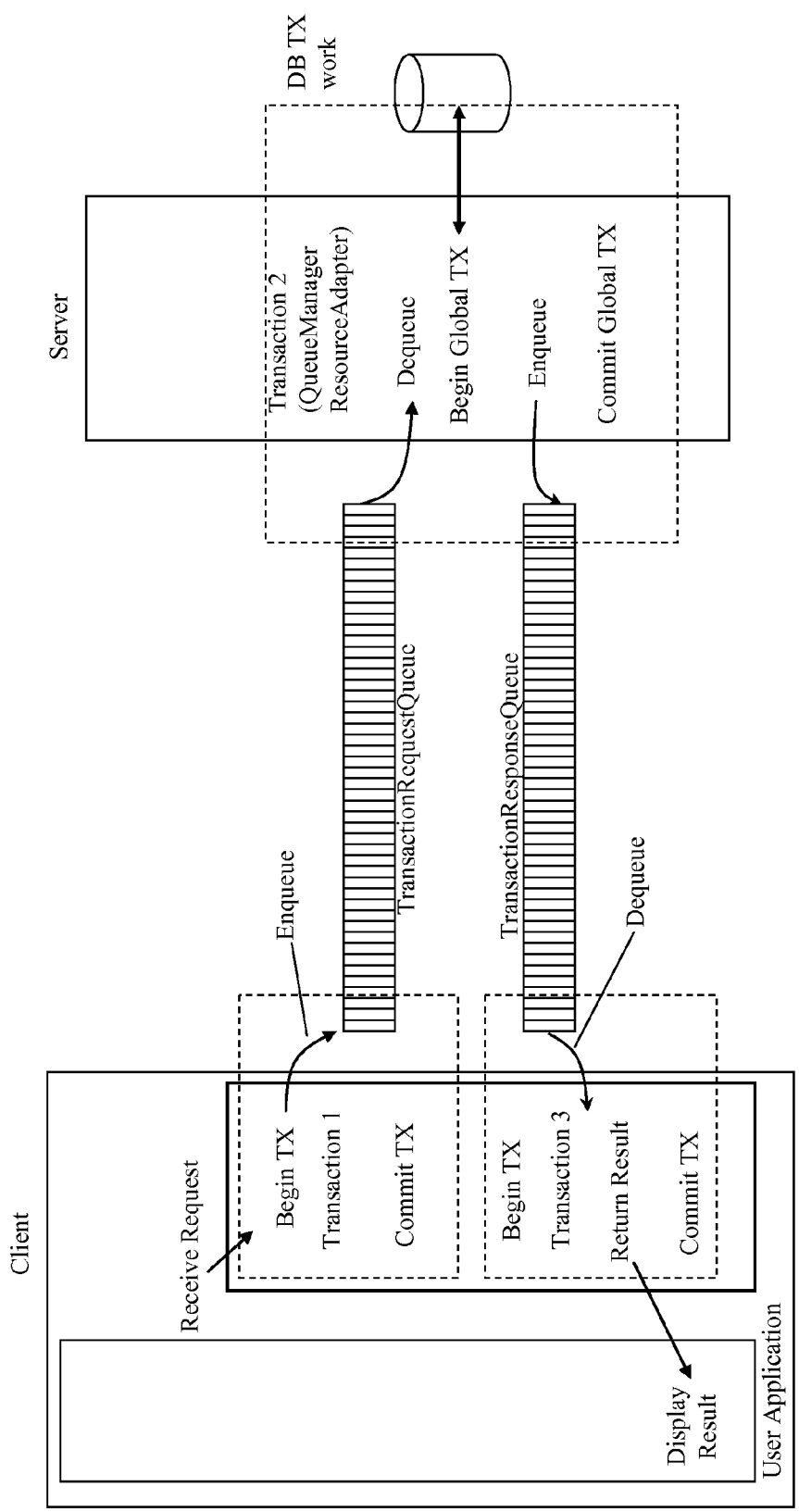
FIG. 3 illustrates transaction flow in a queued transaction processing system incorporated into a J2EE environment in accordance with an exemplary embodiment of the invention.

FIG. 3 illustrates transaction flow in a queued transaction processing system 100 incorporated into a J2EE environment. As a practical example of the use of the queued transaction processing depicted in FIG. 3, consider a bank ATM transaction. The ATM machine corresponds to the client 10 in FIG. 3. The online banking system corresponds to the server 20. The transaction starts with a bank customer inserting a bank card into the ATM machine, entering a pass code, and selecting a transaction type, such as a withdrawal. The ATM machine starts a transaction and enqueues the withdrawal information into the transaction request queue 30 which is the bridge between the ATM machine and the online banking system. This request transaction is then committed at the ATM machine. In FIG. 3, this is identified as Transaction 1. The ATM machine then goes into a wait state until the response comes back.

At the online banking system server, a global transaction is started. The server 20 dequeues the withdrawal information from the transaction request queue 30. The server 20 then runs the appropriate business logic and accesses the database 70 to write the withdrawal information into the database, and receives a result from the database 70. The server 20 enqueues the result into the transaction response queue 40. The server 20 then commits the global transaction. In FIG. 3, this is identified as Transaction 2.

The ATM machine (i.e., client 10) starts the final transaction by dequeuing the entry from the transaction response queue 40. If the result is successful, the ATM machine dispenses money, prints the transaction, and commits. If the result is not successful, the ATM machine displays a warning message to the customer and commits. In FIG. 3, this is identified as Transaction 3.

From the customer point of view, there is only one logical transaction, although there are three separate underlying transactions. Once the transaction is started, the ATM machine must return the result, i.e., successful withdrawal and dispensing of funds, or rejection of the request. The response information is kept in non-volatile storage 70, so that the transactions can be completed in the event of an online banking system failure.

Figure 4:
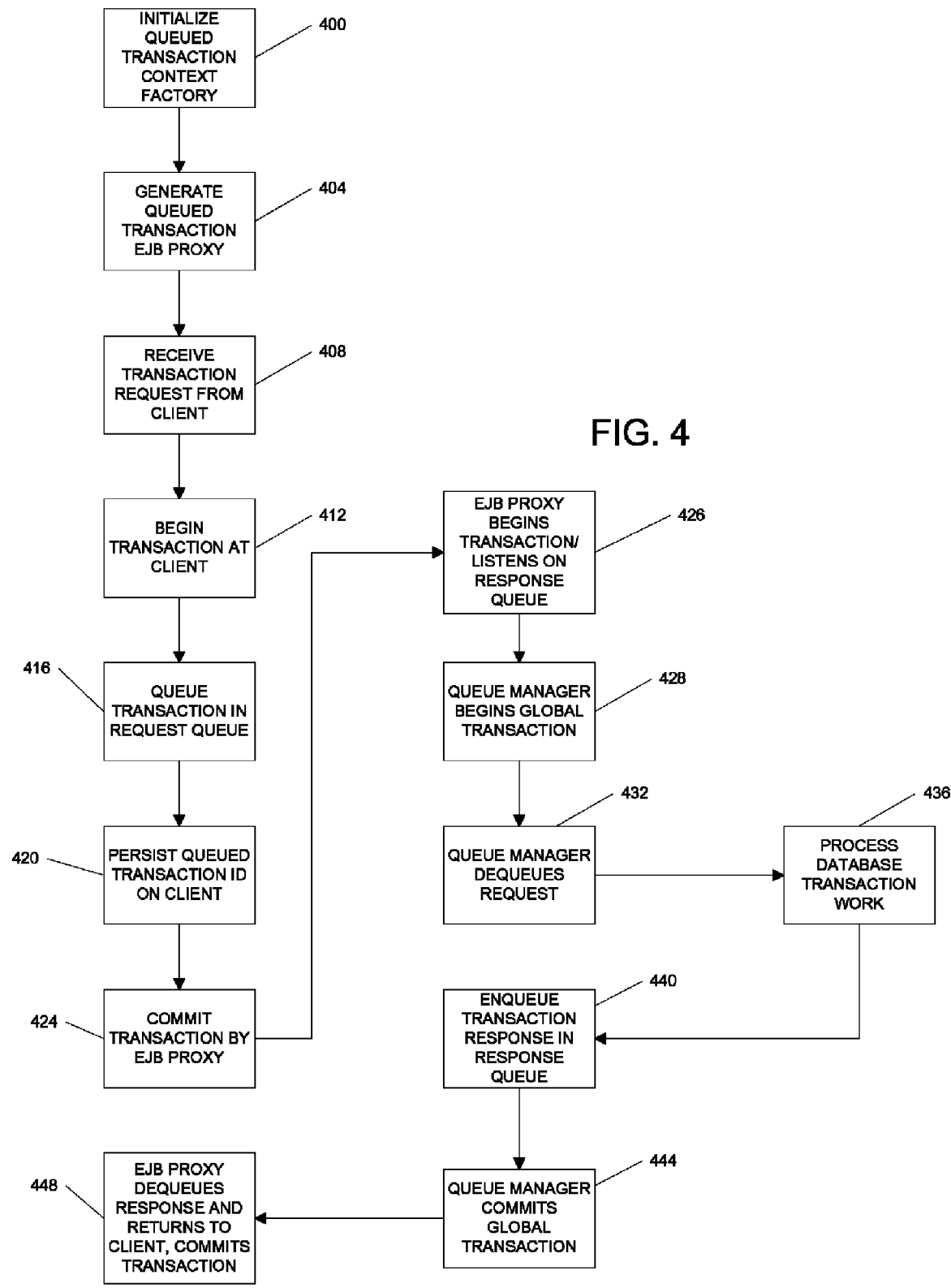
FIG. 4 illustrates the processing logic associated with the queued transaction processing system in accordance with an exemplary embodiment of the invention.

FIG. 4 illustrates the processing logic associated with the queued transaction processing system in a J2EE environment. The following paragraphs describes a basic flow of the queued transaction processing functionality that details a configuration of three machines: the client, the transaction queue manager (server), and the application server.

The J2EE client uses a Queued Transaction InitialContextFactory, an implementation of the standard Java Naming and Directory Interface ("JNDI") defined InitialContextFactory used in J2EE. The Context.PROVIDER_URL environment property is used to initialize the initial context (step 400). All that is required is the configuration of the queue manager and the use and configuration of the Queued Transaction Initial-ContextFactory. The queued transaction functionality is transparent to the client and no code changes are required. Applications may in some cases be tailored to optimize the queued transaction functionality, however, it is not a requirement. Queued Transaction InitialContextFactory has its own configuration file for filtering, fine-grain specification, etc.

The Queued Transaction InitialContextFactory provides Queued Transaction InitialContext instances that return a proxy to the EJB home interface that is found during the client's call to the Queued Transaction InitialContext.lookup (step 404). In turn, any home interface or remote interface returned from this home object is also proxied in the same manner. Lookups via a Queued Transaction InitialContext will always be successful from the client's perspective as the actual lookup against the OC4J/EJB server is not performed until the work is conducted (i.e., the work is dequeued by the queue manager as described below). The class path tells Java tools and applications where to find third-party and user-defined classes that are not part of the Java platform. One of the key benefits of queued transaction processing is the ability to issue work against a server which is either down or can not be contacted for some reason, such as a network communication failure.

A method call by the client via the Queued Transaction EJB proxy (step 408) results in the beginning of a transaction (step 412) and the queuing of the context information (e.g., Context.PROVIDER_URL), method invocation information (class, method, signature), serializable parameters, unique Queued Transaction ID, priority, etc. in a transaction request queue (step 416). Different queues may exist for different priorities, types, etc.

The Queued Transaction EJB proxy may persist the Queued Transaction ID in stable storage on the client within the transaction. This ID may then be used by the client in recovery situations in order to query the Queue Manager and determine the state of the application request and response as the case may be (step 420). Optionally, the client can do other transaction work.

The Queued Transaction EJB proxy commits the transaction with the queued message (step 424). The Queued Transaction EJB proxy then begins the transaction and listens on the transaction response queue (step 426).

An OC4J server, with a Queue Manager maintaining at least one transaction request queue and one transaction response queue, places the application work request submitted by the Queued Transaction EJB proxy in a transaction request queue.

The queue manager begins a global transaction (step 428) and dequeues the request from the transaction request queue within this global transaction (step 432). The queue manager invokes the EJB method that may in turn result in enlistment of any other type of transactional participants such as databases, EIS resource adapters, other middleware servers, etc. (step 436).

The queued transaction manager queues the response on the transaction response queue (step 440). The Queued Transaction EJB proxy listens for a response message on the transaction response queue (step 426). The queue manager commits the global transaction (step 444).

The Queued Transaction EJB proxy dequeues the response corresponding to its Queued Transaction ID from the transaction response queue within a global transaction. The Queued Transaction EJB proxy may also delete this Queued Transaction ID that is persisted using a file or other resource adapter, database, etc. (step 420) on the client within the transaction. The Queued Transaction EJB proxy returns the result to the client and commits the transaction (step 448).

In other embodiments, an OC4J Transaction Queue Service resource adapter could be used to allow specialized behavior. This resource adapter would be deployed to OC4J servers to dequeue work, rather than having a dispatcher at the queue manager thereby providing a pull model that could be used instead of a push model.

In another embodiment, multiple requests could be bundled into a single work unit for queuing rather than discretely queuing every method request.

The system and method of the invention have been described as computer-implemented processes. It is important to note, however, that those skilled in the art will appreciate that the mechanisms of the invention are capable of being distributed as a program product in a variety of forms, and that the invention applies regardless of the particular type of physical signal bearing media utilized to carry out the distribution. Examples of signal bearing media include, without limitation, recordable-type media such as diskettes or CD ROMs.

The foregoing description of exemplary embodiments is provided for the purpose of illustrating the principles of the invention, and not in limitation thereof, since the scope of the invention is defined solely by the appended claims.

What is claimed:

1. A method for processing a transaction between a client and an application server asynchronously in a distributed transaction processing system having at least one transaction queue manager, comprising:
   receiving an application request from the client to initiate the transaction with the application server;
   placing the request in a transaction request queue by the transaction queue manager;
   assigning a queued transaction identifier to the request by the queue manager to identify the request;
   persisting the queued transaction identifier on the client within the transaction to identify the client that initiated the transaction;
   processing the request at the application server asynchronously relative to receipt of the request, and determining a transaction response; and
   placing the transaction response in a transaction response queue by the queue manager for retrieval by the client;
   wherein the queued transaction identifier is used to retrieve the transaction response.

2. The method for processing a transaction of claim 1 wherein processing the request comprises initiating a global transaction and removing the request from the transaction request queue.

3. The method for processing a transaction of claim 2 wherein processing the request further comprises committing the global transaction at the application server.

4. The method for processing a transaction of claim 1 further comprising removing the transaction response from the transaction response queue and returning the transaction response to the client.

5. The method for processing a transaction of claim 1 wherein placing the response in a transaction response queue includes associating the queued transaction identifier with the transaction response by the queue manager.

6. The method for processing a transaction of claim 1 wherein the distributed transaction processing system comprises a J2EE platform.

7. The method for processing a transaction of claim 6 wherein the queue manager provides a bridge between the J2EE platform and an enterprise information system.

8. The method for processing a transaction of claim 7 wherein the enterprise information system comprises at least one of a database and a non-database resource.

9. The method for processing a transaction of claim 1 wherein processing the request comprises a two-phase commit protocol that includes preparing to commit and committing the transaction if each processing operation of the transaction is completed successfully.

10. The method for processing a transaction of claim 1 wherein processing the request comprises a two-phase commit protocol that includes preparing to commit and rolling back the transaction if at least one processing operation of the transaction is not completed successfully.

11. The method for processing a transaction of claim 1 further comprising logging transaction information to a non-volatile data store to recover a transaction processing failure.

12. The method for processing a transaction of claim 1 wherein processing the request and determining the transaction response are performed by the application server asynchronously with respect to receiving the request from the client.

13. The method for processing a transaction of claim 1 further comprising associating a priority with the queued request.

14. The method for processing a transaction of claim 13 further comprising processing the queued request based on the associated priority.

15. A distributed transaction processing system for processing a transaction between a client and an application server asynchronously, comprising:
    a data storage device;
    a processor for executing a plurality of components including:
        a component for receiving an application request from the client to initiate the transaction with the application server;
        a component for placing the request in a transaction request queue;
        a component for assigning a queued transaction identifier to the request to identify the transmission request;
        a component for persisting the queued transaction identifier on the client within the transaction to identify the client that initiated the transaction;
        a component for determining a transaction response to the request asynchronously through interaction with persistent data stored on the data storage device; and
        a component for placing the transaction response in a transaction response queue for retrieval by the client;
    wherein the queued transaction identifier is used to retrieve the transaction response.

16. The system for processing a transaction of claim 15 further comprising a component executable on the processor for initiating a global transaction and removing the request from the transaction request queue for processing.

17. The system for processing a transaction of claim 15 further comprising a component executable on the processor for committing the global transaction.

18. The system for processing a transaction of claim 15 further comprising a component executable on the processor for removing the transaction response from the transaction response queue and returning the response to the client.

19. The system for processing a transaction of claim 15 wherein the component for placing the request in the transaction request queue comprises a transaction queue manager.

20. The system for processing a transaction of claim 15 wherein the component for placing the transaction response in the transaction response queue comprises a transaction queue manager.

21. The system for processing a transaction of claim 20 wherein the transaction queue manager associates a queued transaction identifier with the transaction response.

22. The system for processing a transaction of claim 15 wherein the distributed transaction processing system further comprises a J2EE platform.

23. The system for processing a transaction of claim 15 further comprising a component for logging transaction information to a non-volatile storage to recover a transaction processing failure.

24. The system for processing a transaction of claim 15 further comprising an enterprise information system stored on the data storage device and including at least one of a database and a non-database resource.

25. The system for processing a transaction of claim 24 wherein the non-database resource comprises a legacy software application.

26. A computer program product for processing a transaction between a client and an application server asynchronously in a distributed transaction processing system having at least one transaction queue manager, the program product comprising a non-transitory computer readable medium having computer readable code embedded therein, the computer readable medium comprising:
    program instructions that receive an application request from the client to initiate the transaction;
    program instructions that place the request in a transaction request queue;
    program instructions that assign a queued transaction identifier to the request to identify the request;
    program instructions that persist the queued transaction identifier on the client within the transaction to identify the client that initiated the transaction;
    program instructions that process the request at the application server and determine a transaction response; and
    program instructions that place the transaction response in a transaction response queue for retrieval by the client;
    wherein the queued transaction identifier is used to retrieve the transaction response.

27. The computer program product for processing a transaction of claim 26 wherein the computer readable medium further comprises program instructions that initiate a global transaction and remove the request from the transaction request queue.

28. The computer program product for processing a transaction of claim 26 wherein the computer readable medium further comprises program instructions that commit the global transaction.

29. The computer program product for processing a transaction of claim 26 wherein the computer readable medium further comprises:
    program instructions that remove the transaction response from the transaction response queue; and
    program instructions that return the transaction response to the client.

30. A transaction processing system for processing a transaction between a client and an application server in a J2EE environment, the application server connected to an enterprise information system including at least one database, the transaction processing system comprising:
    a transaction manager including a proxy component for placing an application request from the client in a transaction request queue, and removing the transaction response from a transaction response queue;

a resource manager for preparing and committing resources required by the request;

a messaging interface including the transaction request queue, the transaction response queue, and a transaction queue manager coupled to both the transaction request queue and the transaction response queue and operable with the resource manager, wherein the transaction queue manager assigns a queued transaction identifier to the request to identify the request, persists the queued transaction identifier on the client within the transaction to identify the client that initiated the transaction, removes requests from the transaction request queue for processing by the application server and a database management system, and places transaction responses on the transaction response queue, and wherein the queued transaction identifier is used to retrieve the transaction response; and a processor configured to execute the transaction manager, resource manager, and the transaction queue manager.

31. The transaction processing system of claim 30 wherein the application server is connected to an enterprise information system via a managed connection.

32. The transaction processing system of claim 30 wherein the proxy component comprises a queued transaction Enterprise Java Beans (EJB) proxy.

* * * * *